United States Patent Office 3,772,439
Patented Nov. 13, 1973

3,772,439
COMPOSITION AND PROCESS FOR THE STIMULATION OF GROWTH AND DEVELOPMENT OF ANIMALS
Simon Oeriu and Ion Oeriu, both of Strada Herastrau 15, Bucharest, Rumania
No Drawing. Continuation-in-part of abandoned application Ser. No. 656,015, July 26, 1967, and a continuation-in-part of application Ser. No. 656,059, July 26, 1967, now Patent No. 3,537,838. This application July 31, 1967, Ser. No. 657,068
Claims priority, application Rumania, July 26, 1966, 51,945; July 27, 1966, 51,949
Int. Cl. A61k 27/00
U.S. Cl. 424—249       11 Claims

ABSTRACT OF THE DISCLOSURE

A composition for the stimulation of the growth and development of plants and the stimulation of the growth and development of animals comprising, as its active ingredient, a member selected from the group consisting of cysteine, homocysteine and their cyclic derivatives and salts thereof, and, as a stabilizer for such active ingredient, a member selected from aldehydes and aldehyde-releasing compounds. Also, a process for the stimulation of the growth and development of plants and for the stimulation of the growth and development of animals comprising administering such a composition.

CROSS REFERENCE TO RELATED APPLICATIONS

The present application is a continuation-in-part of our co-pending applications Ser. No. 656,015, now abandoned, and 656,059, now U.S. Pat. No. 3,537,838, both filed July 26, 1967.

The present invention relates to a stimulative composition for stimulating the growth and development of animals and poultry as well as the growth and development of plants. In addition, the present invention relates to a process for administering such a stimulative composition so as to stimulate the growth and development of animals and poultry and the growth and development of plants.

There are many methods known in the prior art for the stimulation of the growth and development of plants. Exemplary processes that have been employed include the administration of electrolytes, vitamins, hormones, synthetic organic substances, extracts of vegetal and animal tissues, etc. While such processes have to some degree, tended to stimulate the growth and development of plants, the use of the materials known in the prior art has had several disadvantages. First of all, all of the materials that have been previously employed have been of such high cost as to make their use economically impractical. In addition, the prior art materials exert a reduced or exaggerated development of some parts of the plant, to the detriment of other parts of the plant, and thus create a very un-uniform action on the growth and development of the plant life. Thus, for example, some of the previously employed materials exert some action on the root system while others exert some action upon the stem or foliage, always to the detriment and disadvantage of the other portions of the plant.

Moreover, many methods and compositions have been previously used and known in the art for stimulating the growth and development of animals and increasing milk secretion. More specifically, some of the techniques were directed to increasing the appetite of the animals whereas other methods proposed inhibiting thyroid activity in order to diminish any metabolic process, etc. The compositions suggested in the prior art and previously utilized have been administered both orally and parenterally, such substances being numerous and varying only in chemical structure and biological mechanism. Exemplary materials that have been previously employed include thiourea derivatives, thiouracil, thiazole, as well as other diverse organic, inorganic acids and salts. In addition, emphasis has been placed on the administration of hormones, vitamins, etc., with or without the association of oligoelements such as phosphorus, zinc, calcium, sodium, copper, etc.

The known stimulative agents, while acting in many respects as a stimulus for the growth and development of animals, etc., present certain disadvantages since, by their nature, or by their action in the metabolic processes, such known stimulative agents do not play an essential role as factors for increasing protein synthesis. Furthermore, known stimulative agents often lead to a disturbance of the hormone equilibrium, accompanied by an adipose amassing and water accumulation.

While cysteine and homocysteine have been known for their ability to increase the milk secretion of animals, products made on the basis of cysteine and homocysteine have had the inherent disadvantage that such products can not be adequately preserved, since the aqueous solutions of such products are extremely unstable. This instability has led to a very rapid loss of the activity of the product based uopn cysteine or homocysteine.

It has now been found, in accordance with the present invention, that a composition can be prepared which acts both as a stimulus for the growth and development of plants, and as a stimulus for the growth and development of animals. Moreover, such a composition eliminates the inherent deficiencies and disadvantages of known compositions employed in the prior art for the growth and development of plants and animals. In addition to the growth and development of animals and poultry, the composition of the present invention tends to raise the meat-fat ratio, stimulate the milk secretion, control sterility caused by hormone disorder in animals, obtain a more resilient and more elastic wool from sheep, and attain a greater bodily weight in both animals and poultry. The composition of the present invention eliminates the disadvantages of known plant-stimulative substances in that it offers a stimulant agent based on the action of substances which give out thiolic groups in the organisms by an enzyme process.

Furthermore, the composition of the present invention eliminates the inherent disadvantages of previously employed animal stimulative substances by setting free in the organism, by enzyme process, very reactive thiolic groups having a special role in the synthesis of nucleic acids and in the protein synthesis, in the stimulation of enzyme activity, in the increase of vitamin-co-enzyme concentration and in the stimulation of hormone activity, especially that of androgen and oestrogen hormones.

The composition of the present invention comprises as the principal active ingredient a material selected from cysteine, homocysteine, cyclic derivatives and salts thereof. When acting as a stimulus in the growth and development of plants, the composition of the present invention may be applied either as an aqueous solution or as a powder, conveniently mixed with conventional pesticides, etc. When the composition of the present invention is employed as a stimulus for the growth and development of animals, etc., such a composition can be administered either orally or parenterally.

It is therefore a principal object of the present invention to provide a composition and method for the stimulation of the growth and development of plants as well as the growth and development of animals, such composition and method being free of the inherent deficiencies and disadvantages of the prior art.

It is a further object of the present invention to provide such a composition and method for the stimulation of the growth and development of plants as well as the growth and development of animals, such composition having as its principal active ingredient a material selected from cysteine, homocysteine, and cyclic derivatives and salts thereof.

Still further objects and advantages of the composition and method of the present invention will become more apparent from the following more detailed description thereof.

The stimulating composition of the present invention comprises as the principal active ingredient, a material selected from cysteine, homocysteine and cyclic derivatives and salts thereof. Suitable materials include cysteine hydrochloride, the sodium salt of cysteine, homocysteine and cyclic derivatives, such as 4-thiazolidine carboxylic acid and its corresponding derivatives obtained with pyruvic or glucuronic acids, 2-methyl-2,4-thiazolidine dicarboxylic acid, 2-(1',2',3',4'-tetrahydroxy-5'-carboxypentyl)-4-thiazolidine carboxylic acid, etc., as well as the N-substituted derivatives of such materials, e.g., N-acetyl-4-thiazolidine carboxylic acid.

In addition, the composition of the present invention contains, as a stabilizer for the active ingredient, a stabilizing amount of a member selected from the group consisting of aldehydes and aldehyde-releasing compounds. Suitable materials include, for example, formaldehyde, acetaldehyde, benzaldehyde, glucosamine and hexamethylenetetramine, a material which yields formaldehyde upon decomposition.

The composition of the present invention may also contain other auxiliary materials as stimulants or for the potentiation of the active ingredients. These include, for example, folic acid, sodium benzoate, calcium sulphosalicylate, lithium sulphosalicylate, magnesium sulphosalicylate, potassium sulphosalicylate, sodium metabisulphite, manganese, and vitamins such as vitamin PP (nicotinamide).

In the preparation of the aqueous solution of the active ingredient and stabilizer in accordance with the present invention, the active ingredient is generally employed in an amount of from about 3.5 to about 5% by weight of the stimulative composition. In addition, the aldehyde or aldehyde-releasing compound employed as a stabilizer for the active cysteine component, is generally employed in a similar amount of from about 3.5 to about 5% by weight of the total composition although lesser or greater amounts of either can be advantageously employed where desired.

It has been found that the employment of the aldehyde or aldehyde-releasing component of the composition of the present invention is not absolutely necessary when a cyclic derivative of cysteine is used as set forth above; however, even when employing such materials, it is sometimes advantageous to include the stabilizing aldehyde or aldehyde-releasing component.

The composition suitably employed for the stimulation of the growth and development of animals and poultry, including the additional auxiliary components set forth above, generally has the following formulation.

| Component: | Percent by weight in aqueous solution |
| --- | --- |
| Cysteine hydrochloride | 3.5–5 |
| Hexamethylenetetramine | 3.5–5 |
| Folic acid | 0.07–0.1 |
| Sodium benzoate | 0.84–1.2 |
| Calcium sulphosalicylate | 0.32–0.45 |
| Lithium sulphosalicylate | 0.035–0.05 |
| Sodium metabisulphite | 1.05–1.5 |

The composition that can be suitably employed for the stimulation of the growth and development of plants generally conforms to the following general formulation.

| Component: | Percent by weight in aqueous solution |
| --- | --- |
| Cysteine hydrochloride | 3.5–5 |
| Hexamethylenetetramine | 3.5–5 |
| Folic acid | 0.07–0.1 |
| Sodium benzoate | 0.84–1.2 |
| Magnesium sulphosalicylate | 0.25–0.35 |
| Potassium sulphosalicylate | 0.1–0.15 |
| Sodium metabisulphite | 1.05–1.5 |
| Manganese | Traces |
| Vitamin PP | Traces, etc. |

The effective compositions of the present invention are prepared by dissolving the desired cysteine compound, e.g., cysteine hydrochloride, in water, in an amount so as to produce a weight percent of the cysteine component as set forth above. Generally, it is preferred that the amount of the active component as well as the additional components in the stimulative composition of the present invention be near or at the upper range set forth in the exemplary compositions above. Thus, for example, a suitable preparation can be prepared by dissolving in water an amount of cysteine hydrochloride so as to produce a composition having 5% of the active ingredient by weight. Similarly, an aldehyde or an aldehyde-releasing compound, such as hexamethylene-tetramine, is dissolved in the aqueous system in an amount to produce approximately 5% by weight of the aldehyde component in the total aqueous composition. To the aqueous composition containing the dissolved cysteine active component and the stabilizing aldehyde or aldehyde-releasing component, may be added one or more of the auxiliary components set forth in the formulation above. Such additional auxiliary components may be added either individually or together to the aqueous composition containing the active stimulant or can be added step-wise to such aqueous composition. It is important to note that a suitable composition can contain one, two, or all of the additional or auxiliary components set forth in the formulations above.

The solution of active components and auxiliary components may then be buffered at a pH of from 5 to 6 and tyndallized or sterilized for a longer conservation of the active composition. It is also possible, however, to employ the composition without first subjecting it to a tyndallization or sterilization process, although greater stability is achieved by tyndallizing or sterilizing the buffered composition. Prior to use, the composition may be diluted to the desired dose limits and administered as desired.

In order to prepare a powdered composition of the active ingredients, the aqueous composition as described above can be evaporated by drying to obtain a desired powder or, a powder can be produced by homogenizing the active ingredient with the other stabilizing and auxiliary components. The powder that is produced either by the evaporation of the aqueous solution or by the homogenization of the components of the composition is usually conserved in air-tight containers and when prepared for treatment is homogenously distributed into talcum or other inert substance to produce a composition having the desired active dose level.

When the composition of the present invention is employed for the stimulation of the growth and development of plants, the composition is administered by sprinkling or moistening the seeds of the plant or its nursery transplant or cuttings or the adult plant or all of them with a solution containing approximately 1 gram of the active component in 1,000 to 10,000,000 milliliters of water. Alternatively, the composition can be employed for the stimulation of the growth and development of plants by swabbing the plants, i.e., nursery transplants or cuttings, saplings or seedlings, with a composition comprising approximately 1 gram of the active component in 1 to 20,000 kilograms of an inert carrier such as mud. Further, the composition of the present invention can be employed as a powder homogenously distributed in talcum or other inert substance in an amount of about 1 gram of active component for every 1 to 20,000 kilograms of seed to be treated. It is, of course, obvious that the amount of the active component to be administered to the plant in order to stimulate the growth and development thereof depends greatly upon the particular plant to be treated.

As noted above, the composition of the present invention is administered either orally or parenterally when employed to stimulate the growth and development of animals and poultry, etc. Usually, the preparation is administered either in an aqueous solution or as a powder, the amount to be administered being approximately 1 gram of active component per 50 kilograms to 500 kilograms of body weight of the animal or animals to be treated.

It is, of course, obvious with respect to both the treatment of plants and the treatment of animals and poultry for purposes of stimulating the growth and development thereof that somewhat less or greater amounts of active components can be administered where desired for particular purposes.

The following specific examples illustrate the novel composition and methods of the present invention. It is to be understood that such examples are for purposes of illustration only and that the present invention is in no way to be deemed as limited thereto.

EXAMPLE I (A) A stimulative composition was prepared by dissolving in 100 grams of water, 5 grams of cysteine hydrochloride in the presence of 5 grams of hexamethylenetetramine. To this were added 0.1 gram of folic acid and 1.2 grams of sodium benzoate as a stabilizer.

The solution thus obtained was buffered at a pH of 5 to 6 and sterilized for longer conservation. This composition was then ready for dilution to the desired active dose limits prior to its administration in treatment.

(B) A similar composition was prepared by replacing the hexamethylenetetramine with 6 grams of glucosamine in a solution of 400 to 450 milliliters alcohol in a concentration of 92% to 93%. Also added was 3.2 milliliters of pyridine. Here again, the composition was ready for dilution to the desired active dosage level prior to administration.

EXAMPLE II

A composition was prepared as in Example 1(A) except that the following additional components were added.

| Stimulants: | Grams |
|---|---|
| Magnesium sulphosalicylate | 0.25 |
| Potassium sulphosalicylate | 0.15 |
| Sodium metabisulphite | 1.5 |
| Potentiators: | |
| Manganese | Traces |
| Vitamin PP | Traces |

Again, this composition was ready for dilution to the desired active dosage level prior to administration.

EXAMPLE III

Example II was repeated except that the cysteine hydrochloride was replaced with an equivalent amount of thiazolidine carboxylic acid. With such a replacement, the aldehyde was no longer necessary.

EXAMPLE IV

A powdered product for the stimulation of growth and development was prepared by evaporating the solution prepared in Example II. The powder produced was homogenously distributed into talcum and was ready for administration.

EXAMPLE V

The composition shown in Example II was diluted with water in order to produce a composition having the desired active component dosage level for the plants discussed below.

For the treatment of maize, a solution was prepared of 1 gram of the active component dissolved in from 25,000 to 250,000 milliliters of water. The amount of water necessary was determined by the weight of the grains for each hectare of maize to be treated.

For treating tomato seeds and nursery transplants, a solution of 1 gram of the active component dissolved in from 40,000 to 100,000 milliliters of water was employed. In swabbing tomato nursery transplants, 1 gram of the active component dissolved in 40 kilograms to 100 kilograms mud was employed.

For school vince cuttings or saplings in nurseries, the swabbing was carried out with 1 gram of the active component per 10 to 250 kilograms of mud and moistening or sprinkling with a solution of the active components shown in Example II was made at a concentration varying between 1 gram of active component per 1,000 to 10,000,000 milliliters of water.

EXAMPLE VI

The following example indicates an extraradicular treatment carried out by sprinkling the plants with the composition shown in Example II at different growth and development stages. Thus, tomato seeds were sprinkled with a solution comprising 1 gram of the active component per 40,000 milliliters water and the plants in a further development stage were treated by sprinkling with a composition varying from 1 gram of active component per 100,000 milliliters water to 400,000 milliliters water.

EXAMPLE VII

Some 25 to 30 kilograms of maize grains necessary for sowing one hectare were moistened by sprinkling with a solution as prepared in Example II containing 1 gram of the active component in an amount of water varying from 25,000 to 250,000 milliliters. The particular amount of water that was employed was determined by the amount of solution that the maize grains could absorb. The treated seeds were shoveled in order to ensure the uniform distribution of the liquid solution. The seeds were conserved in cool rooms until close to germination and were fanned before sowing. The powdered composition illustrated in Example IV was also employed for the treatment of maize seeds. By this method, the powder containing the active component was homogenously distributed in talcum and this composition, admixed with conventional pesticide powders, was applied to the grains in an amount of 1 gram of active component per 25 to 100 kilograms of grain.

In all of the examples above, the treatment with the novel composition of the present invention led to a harmonious development of a plant having a root system which was strongly ramified and developed, thus ensuring conditions of abundant feeding, a more vigorous stem, and a very rich foliage, thus making for a strong assimilation and a richer harvest. In addition, it was found that the employment of the composition of the present invention acts upon the sexual processes, this being evident when sprinkling was accomplished in the inflorescence stage. Furthermore, it was found that the plants that were treated in accordance with the present invention had a higher degree of weather resistance than similar plants which were not so treated.

In addition, it was found that the treatment in accordance with the present invention had an action on the nucleic acids and on protein synthesis, increasing the values of some of the amino acids having a substantial role in growth and those constituting a nitrogen reserve. In some cases, an accumulation of glucides, such as glucose and fructose, was observed.

Furthermore, the treatment of the plants in accordance with the present invention tended to increase the hormone activity, such as that of indolyl acetic acid, etc., and in some plants, such as rice, an increase in vitamins, such as, for example, vitamin $B_1$, was brought about.

EXAMPLE VIII

A composition was prepared as a stimulus for the growth and development of animals and poultry, etc., by admixing the following components:

|  | Parts by weight |
|---|---|
| Cysteine hydrochloride | 5.0 |
| Hexamethylenetetramine | 5.0 |
| Folic acid | 0.1 |
| Sodium benzoate | 1.2 |
| Calcium sulphosalicylate | 0.45 |
| Lithium sulphosalicylate | 0.04 |
| Sodium metabisulphite | 1.5 |

Distilled water, up to 100 parts by weight.

The solution thus prepared was dried by evaporation in order to provide a powdered composition. The product thus obtained was administered to cows on the basis varying from daily to once in two or three days. The administration was carried out by dissolving the powdered composition in an amount of water varying with the amount of morning food to be consumed. Alternatively, however, the powdered composition could be introduced into less water than that necessary for the morning drink in order to ensure the consumption of the whole amount of stimulant to be administered.

In a further experiment, the powdered composition prepared as above was employed in admixture with the fodder and without it being previously dissolved in water. The dose of stimulant that was administered in these ways was approximately 1 gram per 50 kilograms to 500 kilograms of body weight.

EXAMPLE IX

A powdered composition prepared as in Example VIII was administered to chickens by admixing the powdered composition with the chicken feed in an amount of from 1 gram per 50 kilograms to 1 gram per 500 kilograms of body weight of the chickens.

EXAMPLE X

One liter of an injectable composition was produced by admixing the following components:

|  | Parts by weight |
|---|---|
| Cysteine hydrochloride | 50 |
| Hexamethylenetetramine | 50 |
| Folic acid | 1 |
| Sodium benzoate | 12 |
| Calcium sulphosalicylate | 4.5 |
| Lithium sulphosalicylate | 0.5 |
| Sodium metabisulphite | 15 |

Distilled water, up to 1,000 milliliters.

The solution obtained was brought to a pH of from 5 to 6 and was subjected to sterilization. The product was administered in the form of subcutaneous or intramuscular injections once in two days and during the first growth period of the animals the injections were administered only once in three to four days. The dosage administered to cows, to pigs and to chickens was 1 gram of the active component per 100 to 500 kilograms of body weight of the animal.

In the above powdered and aqueous compositions, the calcium and lithium sulphosalicylate as well as the folic acid was employed for the purpose of the potentiation of the action of the active cysteine component. The calcium and lithium sulphosalicylate also increase the diffusability of the stimulant into the body tissue. Moreover, phosphorus plays an important role in the metabolic processes. In addition, sodium benzoate increases the solubility and stability of the folic acid in the solution and sodium metabisulphite potentiates the activity of the active components. In all cases of animal treatment with the composition of the present invention, it was found that the animal attained a greater body weight than other animals not so treated. It was found that when cows, pigs and chickens were treated with the composition of the present invention the ratio of meat to fat was raised and that the milk secretion was stimulated in the cows treated.

It was also found in the course of the experiments conducted, that the stimulation of the animals was superior when the auxiliary substances were added in accordance with the present invention, as compared to the use of the principal active component of the present invention absent the auxiliary components. Thus, the auxiliary components exert a synergistic effect upon the active cysteine stimulant.

While various preferred embodiments of the present invention have been illustrated by way of specific example, it is to be understood that the present invention is in no way to be deemed as limited thereto, but should be construed as broadly as all, or any, equivalents thereof.

What is claimed is:

1. A sterilized stable physiologically acceptable composition useful for stimulating growth and development of a meat-providing animal, buffered at a pH of from 5 to 6 and consisting essentially of:
   (I) a growth and development stimulating effective concentration of an active ingredient which, in salt-free form, is a member selected from the group consisting of
      (a) cysteine and a stabilizer therefor, and
      (b) homocysteine and a stabilizer therefor; and
   (II) an inert carrier for the active ingredient;

the stabilizer being present in an amount sufficient to stabilize the cysteine or homocysteine in the composition and being a member selected from the group consisting of formaldehyde, acetaldehyde, benzaldehyde, glucosamine, hexamethylenetetramine, pyruvic acid and glucuronic acid.

2. A composition according to claim 1 wherein the stabilizer is a member selected from the group consisting of formaldehyde, acetaldehyde, benzaldehyde and glucosamine.

3. A stable physiologically acceptable composition consisting essentially of:
   (I) a growth and development stimulating effective concentration of active ingredient which, in salt-free form, is a member selected from the group consisting of
      (a) cysteine and a stabilizer therefor, and
      (b) homocysteine and a stabilizer therefor; and
   (II) an inert carrier for the active ingredient;

the stabilizer being hexamethylenetetramine and being present in an amount sufficient to stabilize the cysteine or homocysteine in the composition.

4. A stable physiologically acceptable composition according to claim 3, consisting essentially of an aqueous solution of from about 3.5 to about 5.0 percent by weight of a member which, in salt-free form, is selected from the group consisting of cysteine and homocysteine and from about 3.5 to about 5.0 percent by weight of hexamethylenetetramine.

5. A composition according to claim 4 wherein the member is cysteine hydrochloride.

6. A stable physiologically acceptable composition useful for stimulating growth and development of a meat-providing animal and consisting essentially of:
   (I) a growth and development stimulating effective concentration of an active ingredient which, in salt-free form, is a member selected from the group consisting of
      (a) cysteine and acetaldehyde, and (b) homocysteine and acetaldehyde; and
(II) an inert carrier for the active ingredient;

the acetaldehyde being present in an amount sufficient to stabilize the cysteine or homocysteine in the composition.

7. A stable physiologically acceptable composition useful for stimulating growth and development of a meat-providing animal and consisting essentially of:
(I) a growth and development stimulating effective concentration of an active ingredient which, in salt-free form, is a member selected from the group consisting of
(a) cysteine and benzaldehyde, and
(b) homocysteine and benzaldehyde; and
(II) an inert carrier for the active ingredient;
the benzaldehyde being present in an amount sufficient to stabilize the cysteine or homocysteine in the composition.

8. A stable physiologically acceptable composition useful for stimulating growth and development of a meat-providing animal and consisting essentially of:
(I) a growth and development stimulating effective concentration of an active ingredient which, in salt-free form, is a member selected from the group consisting of
(a) cysteine and glucosamine, and
(b) homocysteine and glucosamine; and
(II) an inert carrier for the active ingredient;

the glucosamine being present in an amount sufficient to stabilize the cysteine or homocysteine in the composition.

9. A stable physiologically acceptable composition useful for stimulating growth and development of a meat-providing animal and consisting essentially of:
(I) a growth and development stimulating effective concentration of an active ingredient which, in salt-free form, is a member selected from the group consisting of
(a) cysteine and formaldehyde, and
(b) homocysteine and formaldehyde; and
(II) an inert carrier for the active ingredient;

the formaldehyde being present in an amount sufficient to stabilize the cysteine or homocysteine in the composition.

10. A stable physiologically acceptable composition consisting essentially of:
(I) a growth stimulating effective concentration of active ingredient which, in salt-free form, is a member selected from the group consisting of
(a) cysteine and stabilizer therefor, and
(b) homocysteine and stabilizer therefor; and
(II) an animal feed;
the stabilizer being present in an amount sufficient to stabilize the cysteine or homocysteine in the composition and being a member selected from the group consisting of formaldehyde, acetaldehyde, benzaldehyde, glucosamine, hexamethylenetetramine, pyruvic acid and glucuronic acid.

11. A method for stimulating growth and development of a meat-providing animal which comprises administering orally or parenterally, to the animal an effective growth and development stimulating amount of a stable physiologically acceptable composition consisting essentially of:
(I) a growth and development stimulating effective concentration of active ingredient which, in salt-free form, is a member selected from the group consisting of
(a) cysteine and a stabilizer therefor, and
(b) homocysteine and a stabilizer therefor; and
(II) an inert carrier for the active ingredient;

the stabilizer being hexamethylenetetramine and being present in an amount sufficient to stabilize the cysteine or homocysteine in the composition.

References Cited
UNITED STATES PATENTS

| | | | |
|---|---|---|---|
| 2,738,299 | 3/1956 | Frost et al. | 424—319 |
| 2,816,854 | 12/1957 | Gross | 424—319 |
| 2,819,967 | 1/1958 | Coiby et al. | 99—2 |

OTHER REFERENCES

MacKenzie et al.: "J. Biol. Chem.," vol. 227, pp. 393, 395, 399–400, 405 (1957).

Gregory: "Uses and Applications of Chemicals and Related Materials" (1939), pp. 510–11, 525.

Chem. Abstracts, vol. 63, pp. 12980h–12981a (1965).

Hess et al.: Chem. Abstracts, vol. 32, 1938, pp. 496[9]–497[2].

Gajatto: Chem. Abstracts, vol. 40, 1946, p. 6128[3].

Berg: Chem. Abstracts, vol. 45, 1951, p. 7615d.

Wellers: Chem. Abstracts, vol. 54, 1960, p. 16570a.

Yamada: Chem. Abstracts, vol. 50, 1956, p. 3543e.

Oeriu et al.: Chem. Abstracts, vol. 59, 1963, p. 15685a–h.

Hoshino et al.: Chem. Abstracts, vol. 61, 1964, p. 15101c–e.

JEROME D. GOLDBERG, Primary Examiner

V. D. TURNER, Assistant Examiner

U.S. Cl. X.R.

71—77, 90, 98; 99—2 G; 424—270, 317, 319, 325